(12) United States Patent
Gong et al.

(10) Patent No.: US 9,552,549 B1
(45) Date of Patent: Jan. 24, 2017

(54) RANKING APPROACH TO TRAIN DEEP NEURAL NETS FOR MULTILABEL IMAGE ANNOTATION

(71) Applicant: Google Inc., Mountain View, CA (US)

(72) Inventors: Yunchao Gong, Carrboro, NC (US); King Hong Thomas Leung, Santa Clara, CA (US); Alexander Toshkov Toshev, San Francisco, CA (US); Sergey Ioffe, Mountain View, CA (US); Yangqing Jia, Fremont, CA (US)

(73) Assignee: Google Inc., Mountain View, CA (US)

( * ) Notice: Subject to any disclaimer, the term of this patent is extended or adjusted under 35 U.S.C. 154(b) by 403 days.

(21) Appl. No.: 14/444,272

(22) Filed: Jul. 28, 2014

(51) Int. Cl.
*G06N 3/08* (2006.01)

(52) U.S. Cl.
CPC ..................... *G06N 3/084* (2013.01)

(58) Field of Classification Search
CPC ................. G06N 3/084; G06N 3/08
USPC ............................................ 706/25
See application file for complete search history.

(56) References Cited

U.S. PATENT DOCUMENTS

| | | |
|---|---|---|
| 6,324,532 B1 | 11/2001 | Spence et al. |
| 7,467,159 B2 | 12/2008 | Schaepe et al. |
| 8,078,557 B1 | 12/2011 | Ershov |
| 8,180,754 B1 | 5/2012 | Ershov |
| 8,204,842 B1 * | 6/2012 | Zhang ............... G06F 17/30253 706/45 |
| 8,392,436 B2 | 3/2013 | Bai et al. |
| 8,429,212 B1 * | 4/2013 | Bengio ............. G06F 17/30244 707/732 |
| 2009/0083010 A1 * | 3/2009 | Qi ....................... G06K 9/00711 703/2 |
| 2009/0304272 A1 * | 12/2009 | Makadia .......... G06F 17/30265 382/165 |
| 2009/0313294 A1 * | 12/2009 | Mei .................... G06F 17/30265 |
| 2011/0087660 A1 * | 4/2011 | Yu .................... G06F 17/30265 707/728 |
| 2012/0089552 A1 * | 4/2012 | Chang .............. G06F 17/30817 706/52 |
| 2012/0269436 A1 * | 10/2012 | Mensink ........... G06K 9/00624 382/180 |

(Continued)

OTHER PUBLICATIONS

Gong Y. et al. "Deep Convolutional Ranking for Multilabel Image Annotation", Dec. 23, 2013.*

(Continued)

*Primary Examiner* — Stanley K Hill
*Assistant Examiner* — Dave Misir
(74) *Attorney, Agent, or Firm* — Fish & Richardson P.C.

(57) ABSTRACT

Systems and techniques are provided for a ranking approach to train deep neural nets for multilabel image annotation. Label scores may be received for labels determined by a neural network for training examples. Each label may be a positive label or a negative label for the training example. An error of the neural network may be determined based on a comparison, for each of the training examples, of the label scores for positive labels and negative labels for the training example and a semantic distance between each positive label and each negative label for the training example. Updated weights may be determined for the neural network based on a gradient of the determined error of the neural network. The updated weights may be applied to the neural network to train the neural network.

19 Claims, 5 Drawing Sheets

(56) References Cited

U.S. PATENT DOCUMENTS

2013/0202205 A1* 8/2013 Liu .................. G06F 17/30268
                                                    382/170
2014/0307958 A1* 10/2014 Wang .................. G06K 9/6256
                                                    382/159

OTHER PUBLICATIONS

Weston, Jason et al.,"WSABIE: Scaling Up to Large Vocabulary Image Annotation", IJCAI'11 Proceedings of the Twenty-Second international joint conference on Artificial Intelligence—vol. Three, Jul. 16, 2011, AAAI Press.

* cited by examiner

RANKING APPROACH TO TRAIN DEEP NEURAL NETS FOR MULTILABEL IMAGE ANNOTATION

BACKGROUND

Automated image annotation may be done using neural networks. The neural networks used for image annotation are trained to determine the most appropriate label to apply to a given image. For example, a picture of a cat on a beach may be labeled by a trained neural network with what is considered the most salient feature of the image. If the cat happens to take up most of the image, the cat may be considered the most salient feature, and the neural network may annotate the image with the word "cat." This may be the result of how the neural network was trained, with images in the training examples used to train the neural network being assigned only one correct label. Thus, a neural network that was trained with the image of the cat on the beach may have been trained that "cat" was the only correct label for the image, and that "beach" was an incorrect label. The neural network may then only apply the label "cat" to similar images, even when a label "beach" might also be considered a correct label for the image. This may limit the usefulness of automated image annotation when preparing images to be searched using a query based search engine.

BRIEF SUMMARY

According to an embodiment of the disclosed subject matter label scores may be received for labels determined by a neural network for training examples. Each of the labels may be associated with one of the label scores. One or more of the labels may be a positive label for the training example and one or more of the labels may be a negative label for the training example. An error of the neural network may be determined based on a comparison, for each of the training examples, of the label scores for each of the labels that is a positive label for one of the training examples with each of the labels that is a negative label for the training example and a semantic distance between each of the labels that is a positive label for the one of the training examples and each of the labels that is a negative label for the training example. Updated weights may be determined for the neural network based on a gradient of the determined error of the neural network. The updated weights may be applied to the neural network to train the neural network.

The semantic distance may be determined according to a semantic structure comprising the labels. Determining the error of the neural network may include determining the semantic ranking loss of the label scores. The semantic ranking loss may be determined according to:

$$J = \sum_{i=1}^{n} \sum_{j=1}^{c+} \sum_{k=1}^{c-} D(y_{c+_j}, y_{c-_k}) \max(0, \rho - x_i W_{c+_j} + x_i W_{c-_k})$$

where W is the ranking function of the neural network, n is the number of training examples, $x_i$ is an ith training example, c+ is the number of positive labels for the training example $x_i$, c− is the number of negative labels for the training example $x_i$, ρ is the margin for hinge loss, $y_{c+_j}$ is the jth positive label, $y_{c-_k}$ is kth negative label, $D(y_{c+_j}, y_{c-_k})$ is a function that evaluates the semantic distance between two labels, $y_{c+_j}$ and $y_{c-_k}$, $x_i W_{c+_j}$ is the label score given to the jth positive label when the ranking function W is used to evaluate the training example $x_i$, and $x_i W_{c-_k}$ is the label score given to the kth negative label when the ranking function W is used to evaluate the training example $x_i$.

$D(y_{c+_j}, y_{c-_k})$ may be determined based on the number of nodes traversed to travel between a leaf including the positive label $y_{c+_j}$ and a leaf including the negative label $y_{c-_k}$ in a semantic tree. Determining the updated weights of the neural network may include training the neural network with gradient descent backpropagation. The training examples may be images, and the labels may be words or phrases.

A label may be a positive label for one of the training examples when the label has been predetermined to describe the content of the training example, and a label may be a negative label for the one of the training examples when the label has been predetermined to not describe the content of the training example. Determining the updated weights for the neural network may include attempting to minimize J. There may be two or more positive labels for each of the training examples.

An image may be received with the neural network. A label corpus including labels may be received with the neural network. Each label from the label corpus may be scored by scoring the label with the neural network for the image. The image may be annotated with a predetermined number of the labels with the highest scores from the label corpus.

According to an embodiment of the disclosed subject matter, a means for receiving label scores for labels determined by a neural network for training examples, where each of the labels is associated with one of the label scores, and where one or more of the labels is a positive label for the training example and one or more other of the labels is a negative label for the training example, a means for determining an error of the neural network based on a comparison, for each of the training examples, of the label scores for each of the labels that is a positive label for one of the training examples with each of the labels that is a negative label for the training example and a semantic distance between each of the labels that is a positive label for training example and each of the labels that is a negative label for the training example, a means for determining updated weights for the neural network based on a gradient of the determined error of the neural network, a means for applying the updated weights to the neural network according to train the neural network, a means for receiving, with the neural network, an image, a means for receiving, with the neural network, a label corpus comprising labels, a means for scoring, with the neural network, each label from the label corpus for the image, and a means for annotating the image with a predetermined number of the labels with the highest scores from the label corpus, are included.

Systems and techniques disclosed herein may allow for a ranking approach to train deep neural nets for multilabel image annotation. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
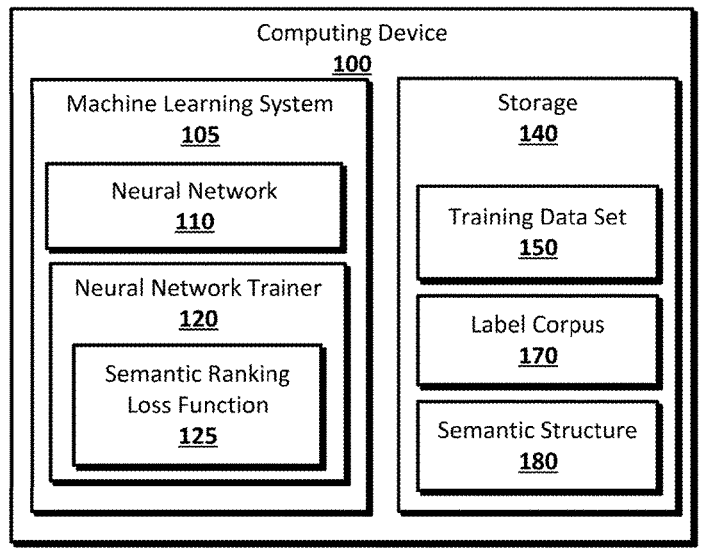
FIG. 1 shows an example system suitable for a ranking approach to train deep neural nets for multilabel image annotation according to an implementation of the disclosed subject matter.

A semantic ranking loss approach may be used to train a neural network for multilabel image annotation. A neural network, such as, for example, a convolutional neural network, may be trained using training examples, which may be, for example, images. The training examples may be annotated with several correct labels, or classifications. For example, the training example image of a cat on a beach may be labeled with "cat", "water", "sand", and "beach." During training, the neural network scores labels for the training examples. The labels may have been divided in positive and negative labels, where the positive labels are the correct labels for the training example. The neural network may be unaware of which labels are positive and which are negative when scoring the labels. The neural network's scores for the positive labels may be compared to the neural network's scores for the negative labels for the training examples, and the level of error, or gradient of the error, in the neural network's predictions may be used to adjust the neural network to make better predictions in the future. The level of error in the neural network's predictions may be determined using semantic loss ranking, which may determine a semantic distance between the positive and negative labels and weight any scoring errors made by the neural network, scoring a negative label higher than a positive label, for example, based on the semantic distance. The total error made by the neural network may be used to train the neural network.

The neural network may be part of any suitable machine learning system, and may be in any suitable form. For example, the neural network may be a convolution neural network, which may be a feed-forward neural network in which certain weights of the neural network are tied together. The neural network may be used for any suitable purpose, such as, for example, image annotation. For example, an image may be input into the neural network, and the neural network may output scores for labels that may be used to annotate the image. The labels may correspond to features of the image, such as, for example, discrete objects depicted in the image, concepts represented by the image, actions taking place within the image, or moods reflected by the image. For example, an image of a wet cat jumping in the air on a beach may be correctly labeled with the object labels "cat" and "beach", the concept label "vacation", the action label "jumping", and mood label "funny". The neural network may predict the labels by, for example, scoring labels from a label corpus for their relevance to a given input. For example, a label corpus may include a number of words that may possibly be applied to describe the content of an image. The neural network may score each of the words in the label corpus based on how well the neural network believes the word describes an input image, with the highest scoring words being output as predicted labels for the image.

The machine learning system of which the neural network is a part may also include a neural network trainer, which may be responsible for the training of the neural network. The neural network trainer may be able to compare scores for positive and negative labels output by the neural network in response to receiving a training example as input. The positive labels for a training example, such as an image, may be, for example, human annotations made to an image. The negative labels may be labels from the label corpus that do not describe the content of the training example, and may be any label in the label corpus which was not designated as a positive label. The neural network trainer may determine how incorrect the neural network's scores for the labels are, and determine updated weights for the neural network based on the magnitude and type of errors found in the neural network's scoring of the labels.

The magnitude and type of error made by the neural network may be determined using semantic ranking loss. Semantic ranking loss may determine how to penalize the incorrectness of the score given to labels based on a semantic distance between the score given to a positive label and the score given to a negative label for a training example. The semantic distance may be based on, for example, the distance between the predicted label and the correct label on a tree that connects the labels semantically. For example, the labels may be leaf nodes on the tree, and the semantic distance between two labels may be the number of nodes that would need to be traversed in the tree to get to the node for one label from the node for the other label. This may result in errors in the neural network's scoring being penalized more heavily when the semantic distinction between labels is greater. For example, the neural network may score a label of "tiger" higher than the label "cat" for an image of a cat on a beach. The neural network may be penalized less for scoring "tiger" higher than "cat" than it would have been for scoring "elephant" higher than "cat", since "tiger" is semantically closer to "cat" than "elephant".

The semantic ranking loss for a neural network may be used to train a neural network based on the minimization of:

$$J = \sum_{i=1}^{n} \sum_{j=1}^{c^+} \sum_{k=1}^{c^-} D(y_{c+j}, y_{c-k}) \max(0, \rho - x_i W_{c+j} + x_i W_{c-k}) \qquad (1)$$

where W represents the ranking function that will be optimized to minimize J, n represents the number of training examples, $x_i$ represents ith training example, c+ represents the number of positive labels for the training example $x_i$, c− represents the number of negative labels for the training example $x_i$, ρ represents the margin for hinge loss, $y_{c+j}$ represents the jth positive label, $y_{c-k}$ represents kth negative label, $D(y_{c+j}, y_{c-k})$ is a function that evaluates the semantic distance between two labels, $y_{c+j}$ and $y_{c-k}$, $x_i W_{c+j}$ represents the score given to the jth positive label when the ranking function W is used to evaluate the training example $x_i$, and $x_i W_{c-k}$ represents the score given to the kth negative label when the ranking function W is used to evaluate the training example $x_i$.

A set of training examples used to train a neural network may include n training examples. Each of the n training examples may be evaluated with relation to c labels. For each training example, the c labels may be divided into positive labels, which may be the correct labels for the training example, and negative labels, which may be improper labels for the training example. There may be c+ positive labels, and c− negative labels. For a given set of training examples c+ may be constant, so that each training example receives the same number of positive and negative labels. The labels may be divided into positive and negative labels by, for example, a human. The training examples may be input to neural network with weights W, which may score each of the n training examples for each of the c labels, including the c+ positive labels and the c− negative labels. The scores for the labels produced by the neural network may be used with (1) to determine J, which may be an error level for the neural network. The weights W may then be adjusted, for example, through the determination of updated weights, to minimize J when the n training examples, or a different set of training example, are input into the neural network. This may result in an optimized neural network for multilabel image annotation.

J may be the sum of the weighted errors made in labeling by the neural network. For each of the n training examples, the neural network's score for each of the positive labels for that training example may be compared with the neural network's score for each of the negative labels. When the neural network has given a positive label a score that is higher than a score for a negative label plus the hinge loss margin ρ, (1) may add a 0 to J, indicating that no error was made. Otherwise, when the score for the positive label is less than the score for the negative label, or within the hinge loss margin, the error may be weighted by the semantic distance between the positive and negative label, with the result added to J. The semantic distance between the positive label and the negative label, $D(y_{c+j}, y_{c-k})$, may be determined by, for example, counting the number of nodes in a semantic tree structure between the positive label and the negative label.

For example, "cat" may be a positive label for an image used as a training example, while "tiger" and "elephant" may be negative labels. A neural network may score both "elephant" and "tiger" higher than "cat" for the image. Because "cat" and "tiger" are semantically similar, the penalty, or error added to J, may be lower when (1) is evaluating the "cat" and "tiger" labels than when (1) is evaluating the "cat" and "elephant" labels, even if "tiger" and "elephant" were scored the same. In this way, errors made by the neural network during training when evaluating semantically similar labels are penalized less than errors evaluating semantically distinct labels, so that errors made with semantically distinct labels may result in greater adjustments to the weights of the neural network when attempting to minimize J. Adjusting the weight of the neural network to minimize J, as determined using an entire set of training examples, may train the neural network to perform multilabel image annotation.

FIG. 1 shows an example system suitable for a ranking approach to train deep neural nets for multilabel image annotation according to an implementation of the disclosed subject matter. A computing device 100 may include a machine learning system 105, which may include a neural network 110 and a neural network trainer 120, and a storage 140. The computing device 100 may be any suitable device, such as, for example, a computer 20 as described in FIG. 6, for implementing the machine learning system 105 and the storage 140. The computing device 100 may be a single computing device, or may include multiple connected computing devices. The neural network 110 may be trained for multilabel image annotation with the neural network trainer 120 using the training data set 150, the label corpus 170, and the semantic structure 180 from the storage 140. The storage 140 may store the training data set 150, the label corpus 170, and the semantic structure 180 in any suitable manner.

The training data set 150 may be any data set suitable for training the neural network 110 of the machine learning system 105. The training data set may include a number of training examples, which may be, for example, images. The images may have been annotated, for example, by a human, using labels from the label corpus 170. The label corpus 170 may include labels, which may be words or phrases in any suitable language that may be used to label a training example, so as to describe the content of the training example. For any given training example, the labels from the label corpus 170 may be divided into two groups, positive labels, which may describe the content of the training example, and negative labels, which may not describe the content of the training example. These may be the training example labels for the training example. For example, the annotations for training examples images may include positive labels, which may describe the content depicted by the image, and negative labels, which may be all labels which do not describe the content depicted by the image. A training example image of a cat on a beach may be annotated with a positive label of "cat", and every label that corresponds to an animal that is not a cat may be a negative label for the image.

The semantic structure 180 may be data structured to allow for the determination of the distance between semantic concepts represented by the labels in the label corpus 170. For example, the semantic structure 180 may be a tree structure, with labels from the label corpus 170 that represent similar concepts being closer in the tree structure than labels that represent distinct semantic concepts. For example, the semantic structure 180 may be a tree structure with a leaf for each label from the label corpus 170. The distance between leaves, based on traversal of the tree structure, may indicate the semantic distance between the labels on the leaves. For example, the leaf for "cat" may be near "tiger", but farther from "elephant", and even farther from "boat," based on traversal distance between leaves. The semantic structure 180 may also be, for example, a look-up table, where the semantic distance between any two of the labels from the label corpus 170 may have been pre-computed based on, for example, the average distance between the labels as determined by textual analysis, for example, of books and other written materials. For example, the semantic distance between two labels may be the average word distance between the labels as found in a body of written materials.

The machine learning system 105 may be any suitable system for implementing any suitable machine learning technique, such as, for example neural networks. The machine learning system 105 may be, for example, hosted on one or multiple servers which may have access to training data, such as the training data set 150. For example, the machine learning system 105 may include the neural network 110 and the neural network trainer 120. The neural network 110 may use any suitable neural network architecture, such as, for example, five convolution layers and three densely connected layer arranged for image recognition and annotation. The neural network 110 may include convolution filters set to square sizes of 11, 9, and 5, for the convolutional layers, and max pooling layers may be used in some of the convolutional layers. Each densely connected layer may have an output size of 4096. Dropout layers may follow each of the densely connected layers with a dropout ratio of 0.6. For all of the layers, rectified linear units (RELU) may be used as a nonlinear activation function The neural network trainer 120 may include a semantic ranking loss function 125, which may be used to determine semantic ranking loss. For example, the training examples from the training data set 150 may be input into the neural network 110, along with the label corpus 170. The neural network 110 may score each of the labels in the label corpus 170 with regard to each of the training examples. The score for a given label and a given training example may represent the degree to which the neural network 110 believes the label describes the content of the training example. For example, if the neural network gives a high score to the label "cat" for an input training image, the neural network may believe that the training example image includes a depiction of a cat.

The semantic ranking loss function 125 may use the scores given to labels from the label corpus 170 by the neural network 110 to determine the magnitude of any error made by the neural network 110. For example, for a given training example, the neural network 110 may give a higher score to a label that is a negative label for the training example than to a label that is a positive labels for the training example based on the training example labels. The error may be determined, for example, according to (1), using the semantic structure 180 to determine the semantic distance between any two labels. The error determined using the semantic ranking loss function 125 may be used to train the neural network 110 in any suitable manner by the neural network trainer 120. For example, the neural network trainer 120 may use gradient descent backpropagation to determine updated weights for the neural network 110, with asynchronous stochastic gradient descent with a momentum term with weight 0.9, a mini-batch size of 32, a global learning rate of 0:002 at the, which begins, and a staircase weight decay that may be applied after a few epochs. The neural network trainer 120 may also apply any suitable function to statistics maintained for the neural network 110 to determine updated weights. The updated weights may be based on a gradient of the error for the neural network 110.

Figure 2:
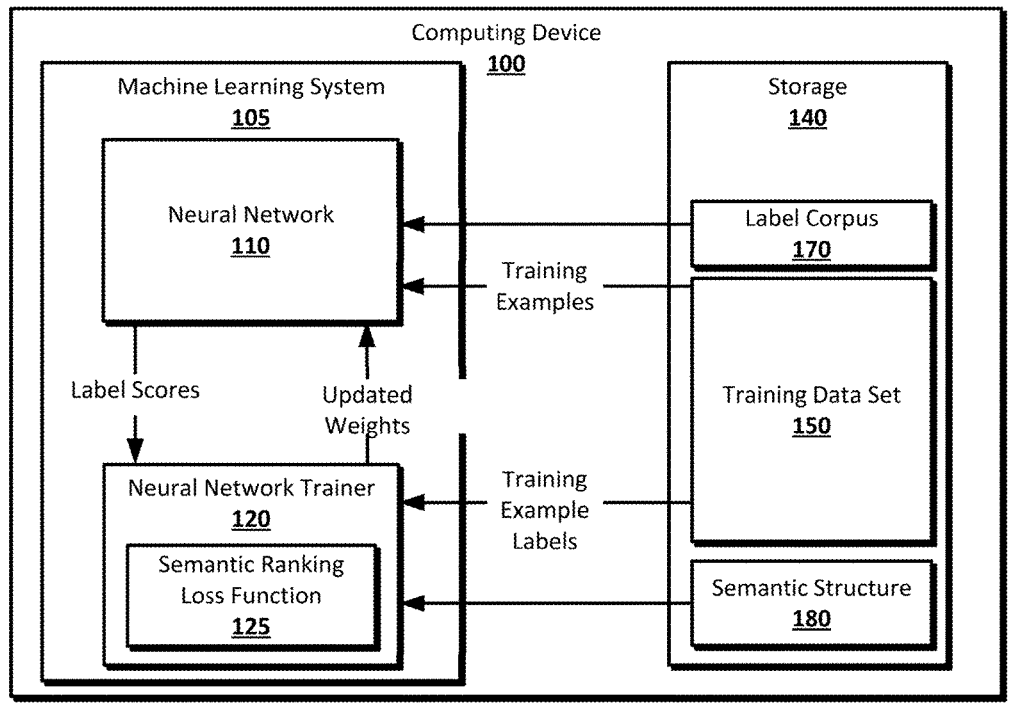
FIG. 2 shows an example arrangement for a ranking approach to train deep neural nets for multilabel image annotation according to an implementation of the disclosed subject matter.

FIG. 2 shows an example arrangement for a ranking approach to train deep neural nets for multilabel image annotation according to an implementation of the disclosed subject matter. The neural network 110 may receive as input the training examples from the training data set 150 and the label corpus 170. The training examples may be, for example, images that have been annotated by a human with training example labels using the label corpus 170. The training example labels for each training example may be divided into positive labels and negative labels.

The neural network 110 may evaluate each of the input training examples against each of the labels from the label corpus 170 to provide a score for each label regarding the training example. For example, the neural network 110 may receive a training example image, and may score each label from the label corpus 170 for that training example image, where the score may represent the level of belief by the neural network 110 that the label describes the content of the training example image. Every label from the label corpus 170 may be scored for every training example from the training data set 150, producing the label scores.

The neural network trainer 120 may receive the label scores as determined by the neural network 110, along with the training examples labels from the training data set 150 and the semantic structure 180. The neural network trainer 120 may then use the semantic ranking loss function 125, which may be (1), to determine any error made in the label scores by the neural network 110. For example, the semantic ranking loss function 125 may compare label score for each label that is identified as a positive label in the training examples to the label score for each label that is identified as a negative label in the training examples, to determine if the neural network 110 scored the positive labels higher than the negative labels. In instances where a positive label was scored higher than a negative label, the neural network trainer 120 may determine that no error was made. There may be some margin, for example, a hinge loss margin, by which the positive label's score must be higher than the negative label's for a determination that no error was made. If the positive label's score is lower than the negative label's score, an error may have been made. The magnitude of the error, which may be the difference in the scores, plus the margin, may be weighted by the semantic distance between the positive label and the negative label, as determined, for example, using the semantic structure 180.

The error determined by the semantic ranking loss function 125 may be used by the neural network trainer 120 to determine updated weights adjustments for the neural network 110, for example, using gradient descent backpropagation. The updated weights may be used to change the weights of the neural network 110, which may then be trained further using the training examples from the training data set 150 that were just used, training examples from the training data set 150 that have not been used, or additional training examples added to the training data set 150.

The machine learning system 105 may train the neural network 110 in batch mode or online. For online training, the neural network trainer 120 may determine updated weights after receiving all of the label scores for the labels for a single training example from the training data set 150 as soon as the neural network 110 determines them, without waiting for the label scores from other training examples. In batch learning, the neural network trainer 120 may only determine updated weights after receiving label scores for all of the training examples from the training data set 150.

Figure 3:
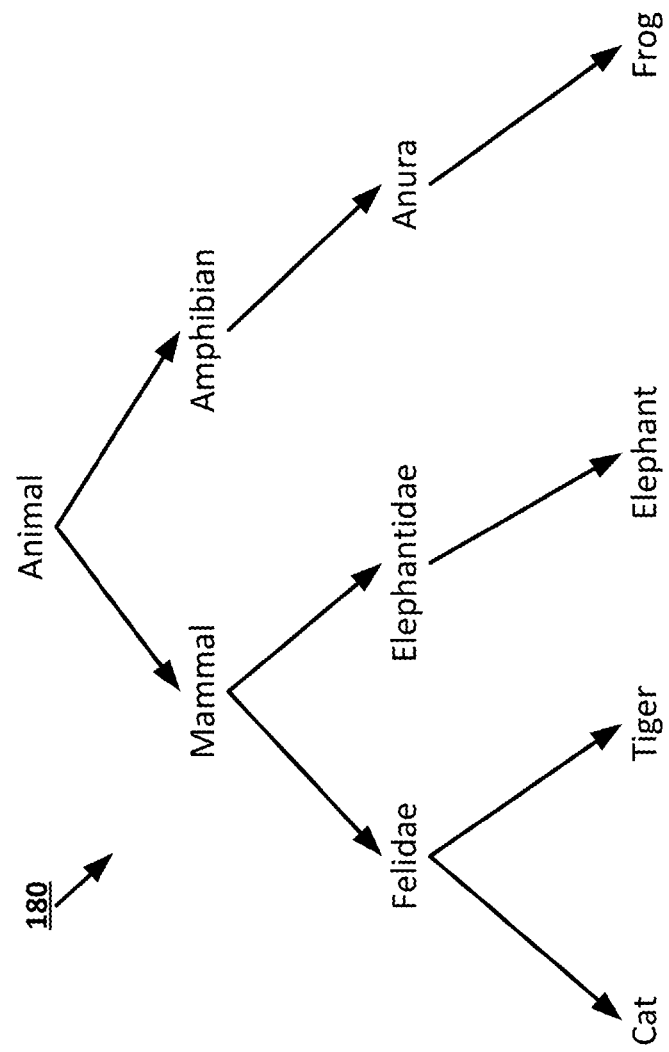
FIG. 3 shows an example semantic structure for a ranking approach to train deep neural nets for multilabel image annotation according to an implementation of the disclosed subject matter.

FIG. 3 shows an example semantic structure for a ranking approach to train deep neural nets for multilabel image annotation according to an implementation of the disclosed subject matter. The semantic structure 180 may be, for example a tree structure organized based on semantic relationships between labels from the label corpus 170. For example, labels related to living creatures may be organized in the tree structure at least partially based on biological classification systems, such that the labels for "cat" and "tiger" may both be under the category felidae, which may be under mammal, which my under animal. "elephant" may be also be under animal and mammal, but may be under elephantidae. The semantic distance between "cat" and "tiger" labels in the semantic structure 180 may be determined to be 1, since there is only one node that needs to be traversed between the leaf nodes for each of the labels. The semantic distance between "cat" and "elephant" may be 3, as three nodes may need to be traversed to travel from leaf for "cat" to the leaf for "elephant." This may indicate that "elephant" is more semantically distant from "cat" than "tiger" is, and thus giving a high score to "tiger" for a training example image depicting a cat may be less of an error than giving a high score to "elephant" for the same training example image.

Figure 4:
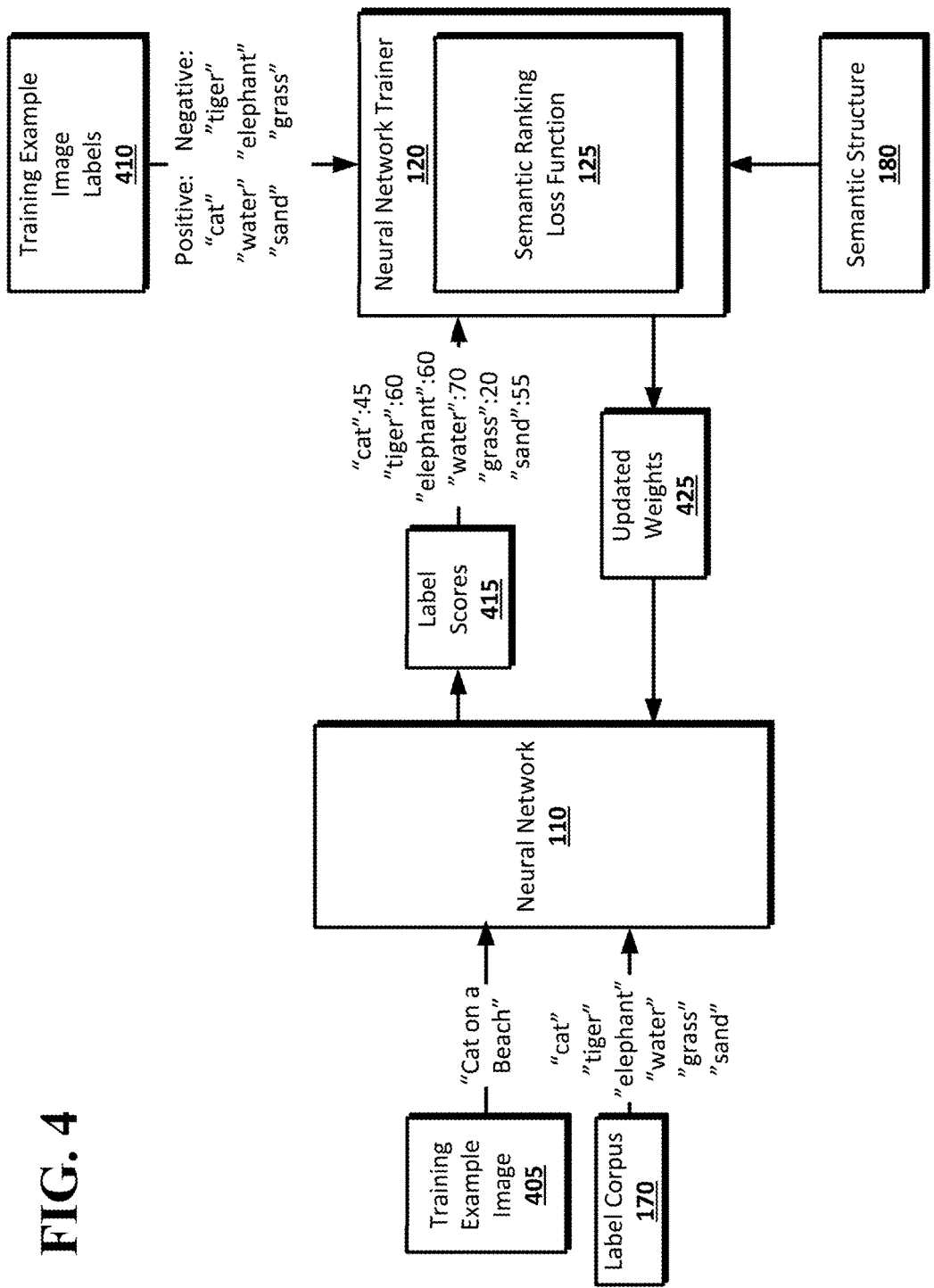
FIG. 4 shows an example arrangement for a ranking approach to train deep neural nets for multilabel image annotation according to an implementation of the disclosed subject matter.

FIG. 4 shows an example arrangement for a ranking approach to train deep neural nets for multilabel image annotation according to an implementation of the disclosed subject matter. The neural network 110 may receive a training example image 405, which may be one of the training examples from the training data set 150, and the label corpus 170. The training example image 405 may be, for example, an image depicting a cat on a beach. The label corpus 170 may include, for example, the labels "cat", "tiger", "elephant", "water", "grass", and "sand." The neural network 110 may score each of the labels from the label corpus 170 for the training example image 405, producing label scores 415. For example, the label scores 415 may include a score of 45 for "cat", 60 for "tiger", 60 for "elephant", 70 for "water", 20 for "grass", and 55 for "sand".

The neural network trainer 120 may receive the label scores 415, the semantic structure 180, and training example image labels 415. The training example image labels 415 may be the training example labels in the training data set 150 for the training example image 405, and may be divided into positive and negative labels. For example, the training example image labels 415 may include positive labels of "cat", "water", and "sand", and negative labels of "tiger", "elephant", and "grass." The semantic ranking loss function 125 may be used to determine the magnitude of the error the neural network 110 may have made in the label scores 415. For example, the semantic ranking loss function 125 may use (1), with n=1, as only the training example image 405 may be under evaluation, c+=3, as there may be 3 positive labels in the training example image labels 410, c−=3, as there may be 3 negative labels in the training example image labels 410, and ρ=5. The semantic distance $D(y_{c+_j}, y_{c-_k})$ may be determined using the semantic structure 180, which may be, for example, a tree structure. For example, according to (1), when i=1 and j=1, an error of 1*max(0.5−45+60)=20 may be added to J, as the neural network 110 may be penalized for scoring "tiger" higher than "cat", and the semantic distance between the two labels may be 1. According to (1), when i=1 and j=2, an error of 3*max(0.5−45+60)=60 may be added to J. The neural network 110 may be penalized more for scoring "elephant" higher than "cat", even though "elephant" was given the same label score as "tiger", because "elephant" is more semantically distinct from "cat" than is "tiger."

The neural network trainer 120 may use the error determined by the semantic ranking loss function 125 to determine updated weights 425. The updated weights 425 may be then be used to adjust the weights of the neural network 110, for example, to train the neural network 110 for multilabel image annotation.

Figure 5:
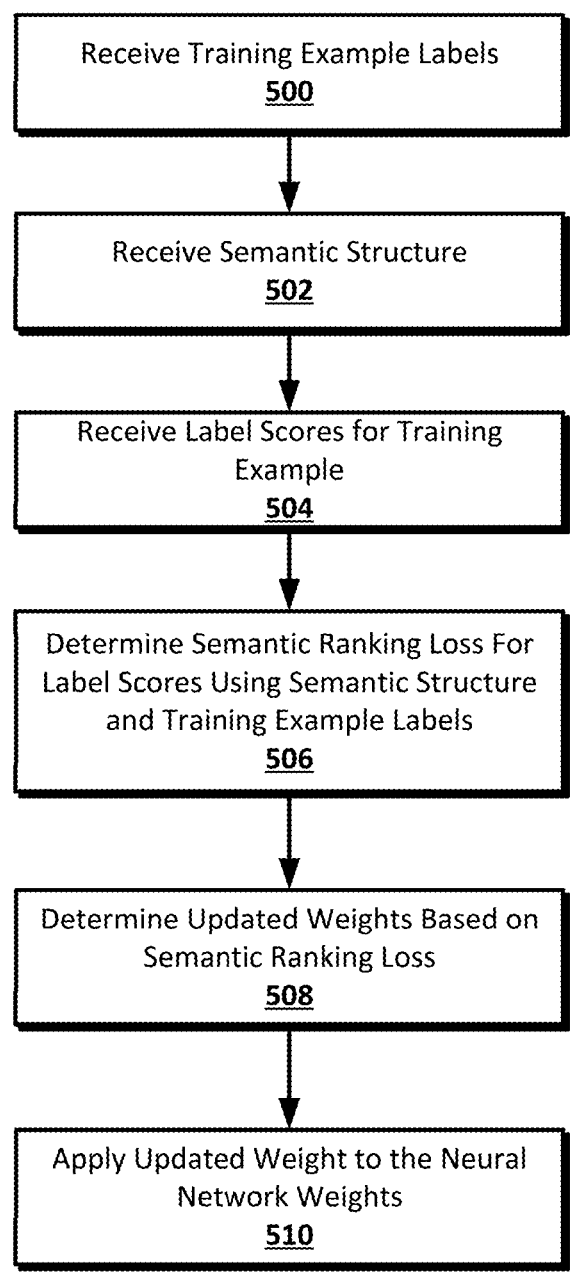
FIG. 5 shows an example of a process for a ranking approach to train deep neural nets for multilabel image annotation according to an implementation of the disclosed subject matter.

FIG. 5 shows an example of a process for a ranking approach to train deep neural nets for multilabel image annotation according to an implementation of the disclosed subject matter. At 500, training example labels may be received. For example, the neural network trainer 120 may receive training example labels, such as the training example image labels 410, corresponding to a training example, such as the training example image 405, from the training data set 150. The training example labels may be divided in positive labels and negative labels for their associated training example.

At 502, a semantic structure may be received. For example, the neural network trainer 120 may receive the semantic structure 180. The semantic structure 180 may include semantic distances between labels in the label corpus 170 from which the training example labels, such as the training example image labels 410, were taken.

At 504, label scores may be received. For example, the neural network 110 may determine label scores, such as the label scores 415, for the training example, for example, the training example image 405. The neural network trainer 120 may receive the label scores from the neural network 110.

At 506, semantic ranking loss may be determined for the label scores using the semantic structure and training example labels. For example, the semantic ranking loss, which may be the magnitude of the error of the neural network 110, may be determined by the neural network trainer 120 using the semantic ranking loss function 125, for example, according to (1). The semantic structure 180 may be used to determine the semantic distance between two labels. The semantic ranking loss function 125 may compare the label scores given to each of the positive labels with the label scores given to each of the negative labels by the neural network 110, weighting any errors based on the semantic distance between the labels being compared.

At 508, weight adjustment may be determined. For example, the neural network trainer 120 may use the semantic ranking loss determined using the semantic ranking loss function 125 to determine updated weights for the neural network 110. The neural network trainer 120 may determine the updated weights using, for example, gradient descent with backpropagation. The neural network trainer 120 may determine the updated weights based on semantic ranking loss determined for individual training examples from the training data set 150, for example, as in online-learning, or after determining the semantic ranking loss for any number of training examples from the training data set 150, as in batch learning. The updated weights may be determined, for example, by applying any suitable function to statistics maintained for the neural network 110. The updated weights may be based on a gradient of the error for the neural network 110.

At 510, the updated weights may be applied to the neural network. For example, the neural network trainer 120 apply the updated weights to the neural network 110, replacing any current weights with the updated weights determined from the semantic ranking loss for the neural network's label scores. Applying the updated weights to the neural network 110 may train the neural network 110 for multilabel image annotation.

Figure 6:
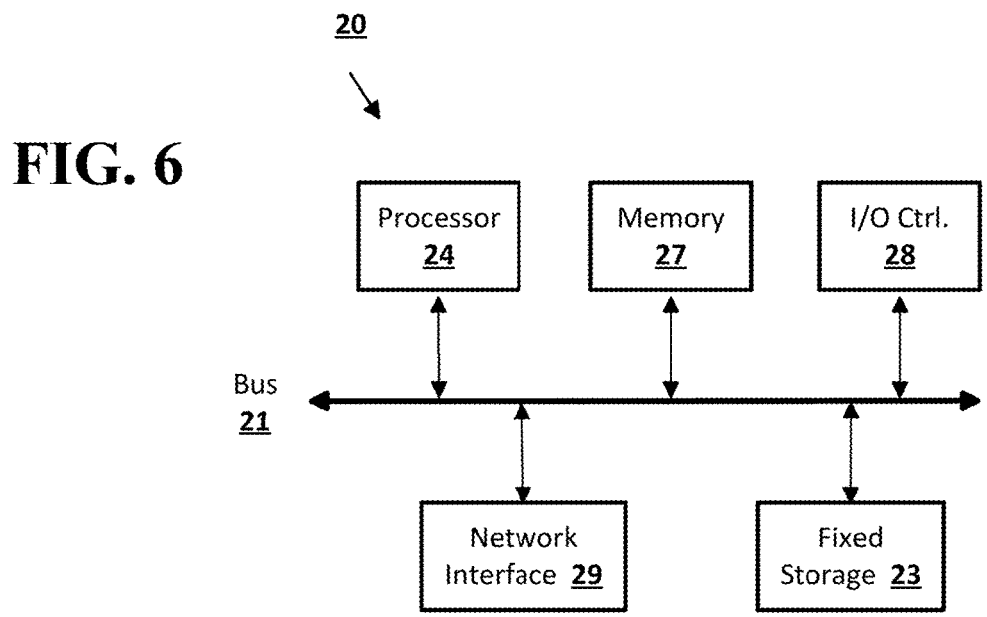
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
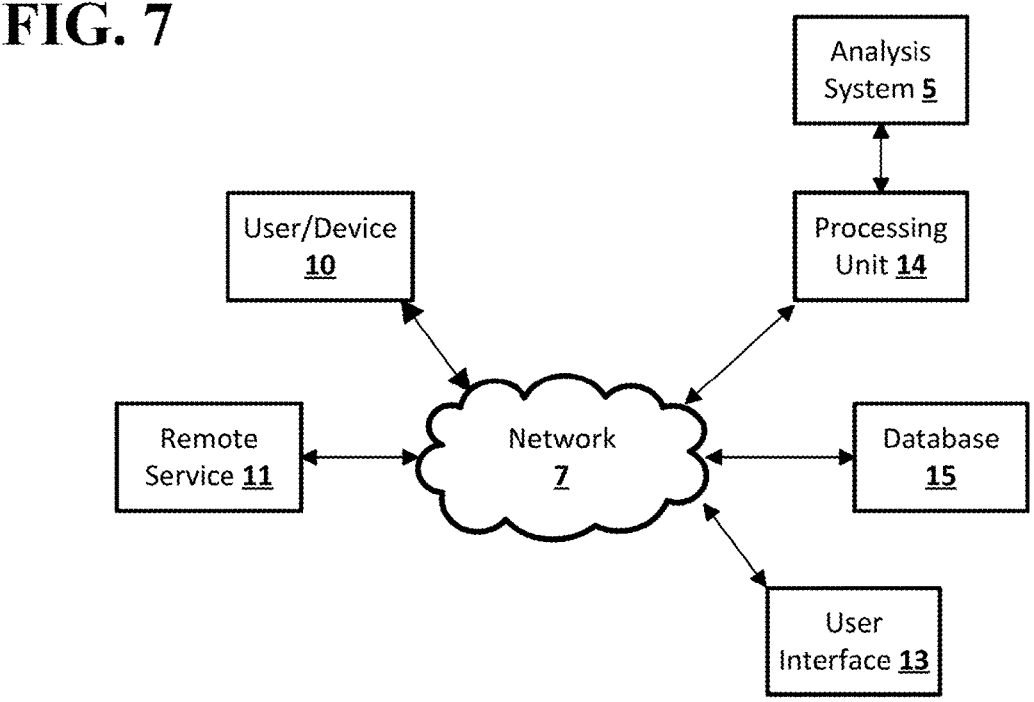
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method performed by one or more computers, the method comprising:

receiving respective label scores determined by a neural network for each of at least two labels for at least one training example, wherein at least one of the at least two labels for each training example is a positive label for the training example and at least one other of the at least two labels for each training example is a negative label for the training example;

determining an error of the neural network based on a semantic ranking loss of the label scores, wherein the semantic ranking loss is determined according to:

$$J = \sum_{i=1}^{n} \sum_{j=1}^{c+} \sum_{k=1}^{c-} D(y_{c+_j}, y_{c-_k}) \max(0, \rho - x_i W_{c+_j} + x_i W_{c-_k})$$

where W is a ranking function of the neural network, n is the number of training examples, $x_i$ is an ith training example, c+ is the number of positive labels for the training example $x_i$, c− is the number of negative labels for the training example $x_i$, $\rho$ is a margin for hinge loss, $y_{c+_j}$ is the jth positive label, $y_{c-_k}$ is kth negative label, $D(y_{c+_j}, y_{c-_k})$ is a function that evaluates the semantic distance between two labels, $y_{c+_j}$ and $y_{c-_k}$, $x_i W_{c+_j}$ is the label score given to the jth positive label when the ranking function W is used to evaluate the training example $x_i$, and $x_i W_{c-_k}$ is the label score given to the kth negative label when the ranking function W is used to evaluate the training example $x_i$;

determining updated weights for the neural network based on a gradient of the determined error of the neural network; and applying the updated weights to the neural network to train the neural network.

2. The method of claim 1, wherein $D(y_{c+_j}, y_{c-_k})$ is determined based on number of nodes traversed to travel between a leaf for the positive label $y_{c+_j}$ and a leaf for the negative label $y_{c-_k}$ in a semantic tree.

3. The method of claim 1, wherein determining the updated weights of the neural network comprises training the neural network with gradient descent backpropagation.

4. The method of claim 1, wherein the at least one training example is an image, and wherein the at least two labels are each respective words or phrases.

5. The method of claim 1, wherein a label is a positive label for one of the at least one training example when the label has been predetermined to describe the content of the training example, and wherein a label is a negative label for the one of the at least one training example when the label has been predetermined to not describe the content of the training example.

6. The method of claim 1, wherein determining the updated weights for the neural network comprises attempting to minimize J.

7. The method of claim 1, wherein there are two or more positive labels for each of the at least one training example.

8. The method of claim 1, further comprising:
receiving an image;
receiving a label corpus comprising labels;
scoring, by the neural network, each label from the label corpus with a score representing how well the label describes the image; and
annotating the image with a predetermined number of the labels with highest scores from the label corpus.

9. A system for a ranking approach to training deep neural networks for multilabel image annotation, comprising:
one or more computers;
storage coupled to the one or more computers on which is stored a training data set including training examples, a label corpus, and a semantic structure; and
a machine learning system deployed on the one or more computers, the machine learning system comprising a neural network and a neural network trainer,
the neural network adapted to receive the label corpus and training examples from the training data set, generate respective label scores for each of at least two labels in the label corpus for at least one training example from the training data set, and receive updated weights, and
the neural network trainer adapted to determine an error of the neural network based on a semantic ranking loss of the label scores and to determine the semantic ranking loss according to:

$$J = \sum_{i=1}^{n} \sum_{j=1}^{c+} \sum_{k=1}^{c-} D(y_{c+j}, y_{c-k}) \max(0, \rho - x_i W_{c+j} + x_i W_{c-k})$$

where W is a ranking function of the neural network, n is the number of training examples, $x_i$ is an ith training example, c+ is the number of positive labels for the training example $x_i$, c− is the number of negative labels for the training example $x_i$, $\rho$ is a margin for hinge loss, $y_{c+j}$ is the jth positive label, $y_{c-k}$ is kth negative label, $D(y_{c+j}, y_{c-k})$ is a function that evaluates the semantic distance between two labels, $y_{c+j}$ and $y_{c-k}$, $x_i W_{c+j}$ is the label score given to the jth positive label when the ranking function W is used to evaluate the training example $x_i$, and $x_i W_{c-k}$ is the label score given to the kth negative label when the ranking function W is used to evaluate the training example $x_i$.

10. The system of claim 9, wherein the neural network trainer is further adapted to determine $D(y_{c+j}, y_{c-k})$ based on number of nodes traversed to travel between a leaf for the positive label $y_{c+j}$ and a leaf for the negative label $y_{c-k}$ in a semantic tree.

11. The system of claim 9, wherein the neural network trainer is further adapted to determine the updated weights of the neural network by training the neural network with gradient descent backpropagation.

12. The system of claim 9, wherein the training data set comprises training example images.

13. The system of claim 9, wherein a label is a positive label for one of the at least one training example when the label has been predetermined to describe the content of the training example, and wherein a label is a negative label for the one of the at least one training example when the label has been predetermined to not describe the content of the training example.

14. The system of claim 9, wherein the neural network trainer is further adapted to determine the updated weights for the neural network by attempting to minimize J.

15. The system of claim 9, wherein there are two or more positive labels for each of the at least one training example from the training data set.

16. The system of claim 9, wherein the neural network is further adapted to receive an image, receive the label corpus comprising labels, score, by the neural network, each label from the label corpus as to how well the label describes the image; and annotate the image with a predetermined number of the labels with highest scores from the label corpus.

17. A system comprising: one or more computers and one or more storage devices storing instructions which are operable, when executed by the one or more computers, to cause the one or more computers to perform operations comprising:
receiving respective label scores determined by a neural network for at least two labels for at least one training example wherein at least one of the at least two labels for each training example is a positive label for the training example and at least one other of the at least two labels is a negative label for the training example;
determining an error of the neural network based on a semantic ranking loss of the label scores, wherein the semantic ranking loss is determined according to:

$$J = \sum_{i=1}^{n} \sum_{j=1}^{c+} \sum_{k=1}^{c-} D(y_{c+j}, y_{c-k}) \max(0, \rho - x_i W_{c+j} + x_i W_{c-k})$$

where W is a ranking function of the neural network, n is the number of training examples, $x_i$ is an ith training example, c+ is the number of positive labels for the training example $x_i$, c− is the number of negative labels for the training example $x_i$, $\rho$ is a margin for hinge loss, $y_{c+j}$ is the jth positive label, $y_{c-k}$ is kth negative label, $D(y_{c+j}, y_{c-k})$ is a function that evaluates the semantic distance between two labels, $y_{c+j}$ and $y_{c-k}$, $x_i W_{c+j}$ is the label score given to the jth positive label when the ranking function W is used to evaluate the training example $x_i$, and $x_i W_{c-k}$ is the label score given to the kth negative label when the ranking function W is used to evaluate the training example $x_i$;
determining updated weights for the neural network based on a gradient of the determined error of the neural network; and
applying the updated weights to the neural network to train the neural network.

18. The system of claim 17, wherein $D(y_{c+j}, y_{c-k})$ is determined based on number of nodes traversed to travel between a leaf for the positive label $y_{c+j}$ and a leaf for the negative label $y_{c-k}$ in a semantic tree.

19. The system of claim 17, wherein determining the updated weights of the neural network comprises training the neural network with gradient descent backpropagation.

* * * * *